June 13, 1950
C. C. FUERST
2,511,201
AUTOMATIC HIGH-SPEED SYMMETRICAL BLADE
AND COVER BLIND SHUTTER
Filed May 21, 1947
3 Sheets-Sheet 1
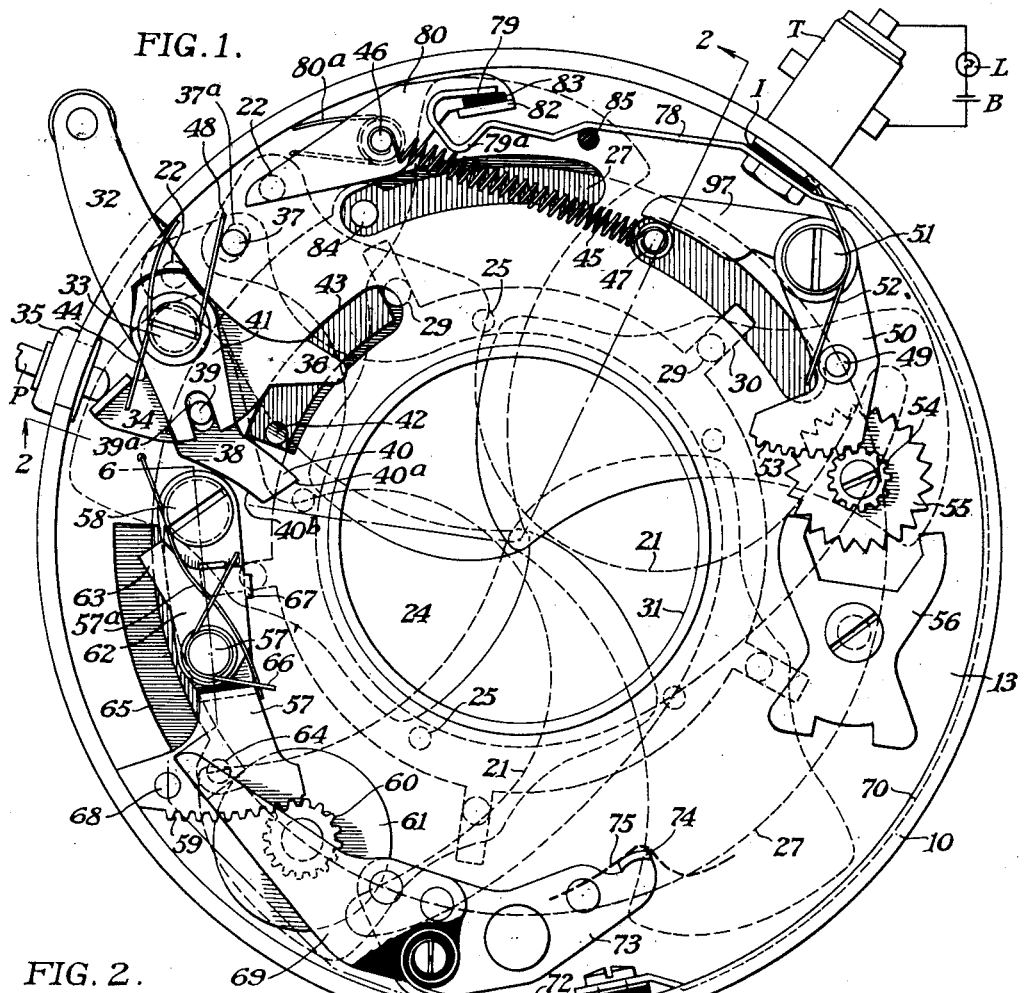
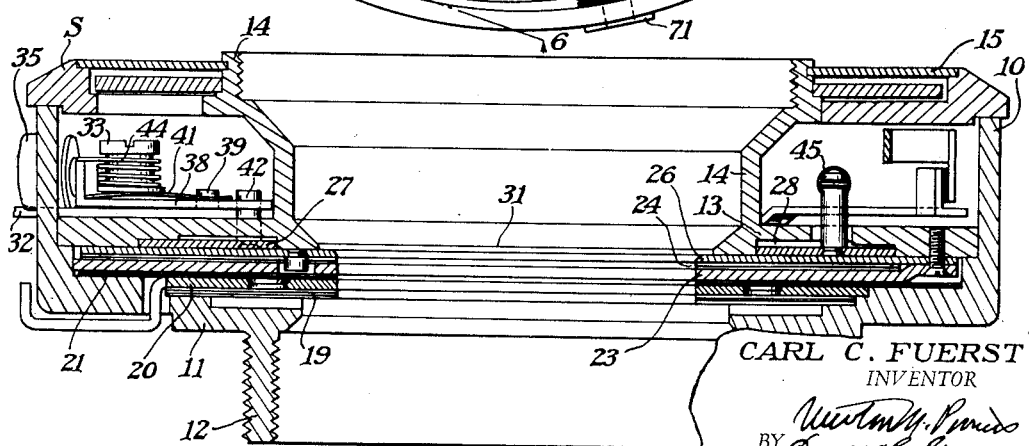
CARL C. FUERST
INVENTOR
BY
ATTORNEYS June 13, 1950
C. C. FUERST
2,511,201
AUTOMATIC HIGH-SPEED SYMMETRICAL BLADE
AND COVER BLIND SHUTTER
Filed May 21, 1947
3 Sheets-Sheet 2
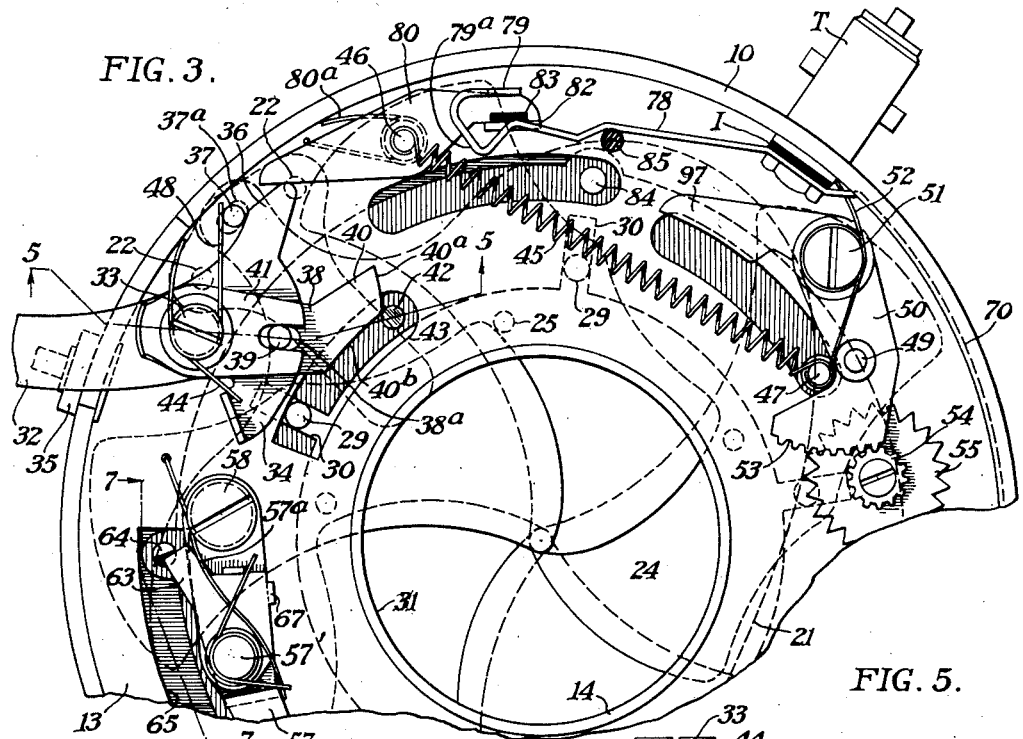
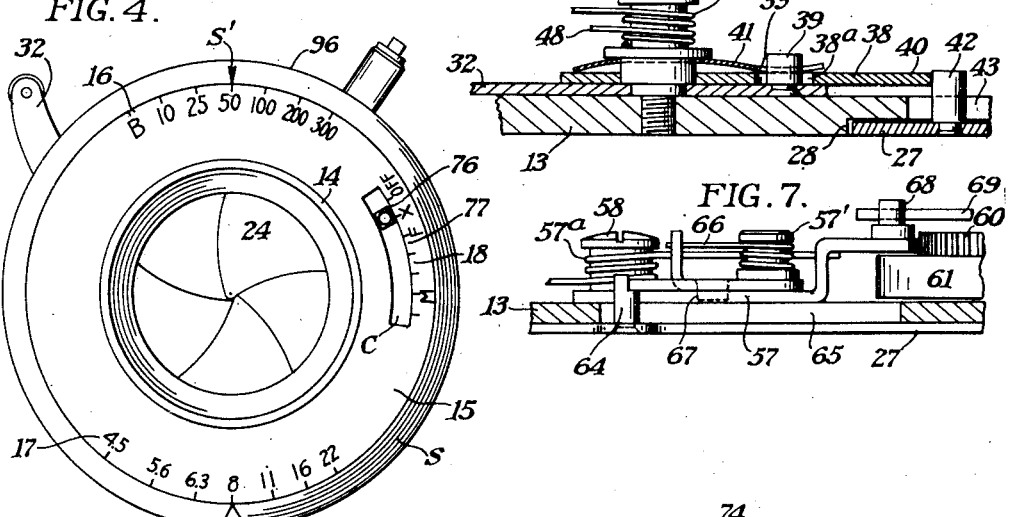
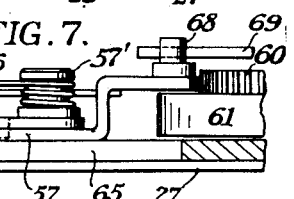
CARL C. FUERST
INVENTOR
ATTORNEYS

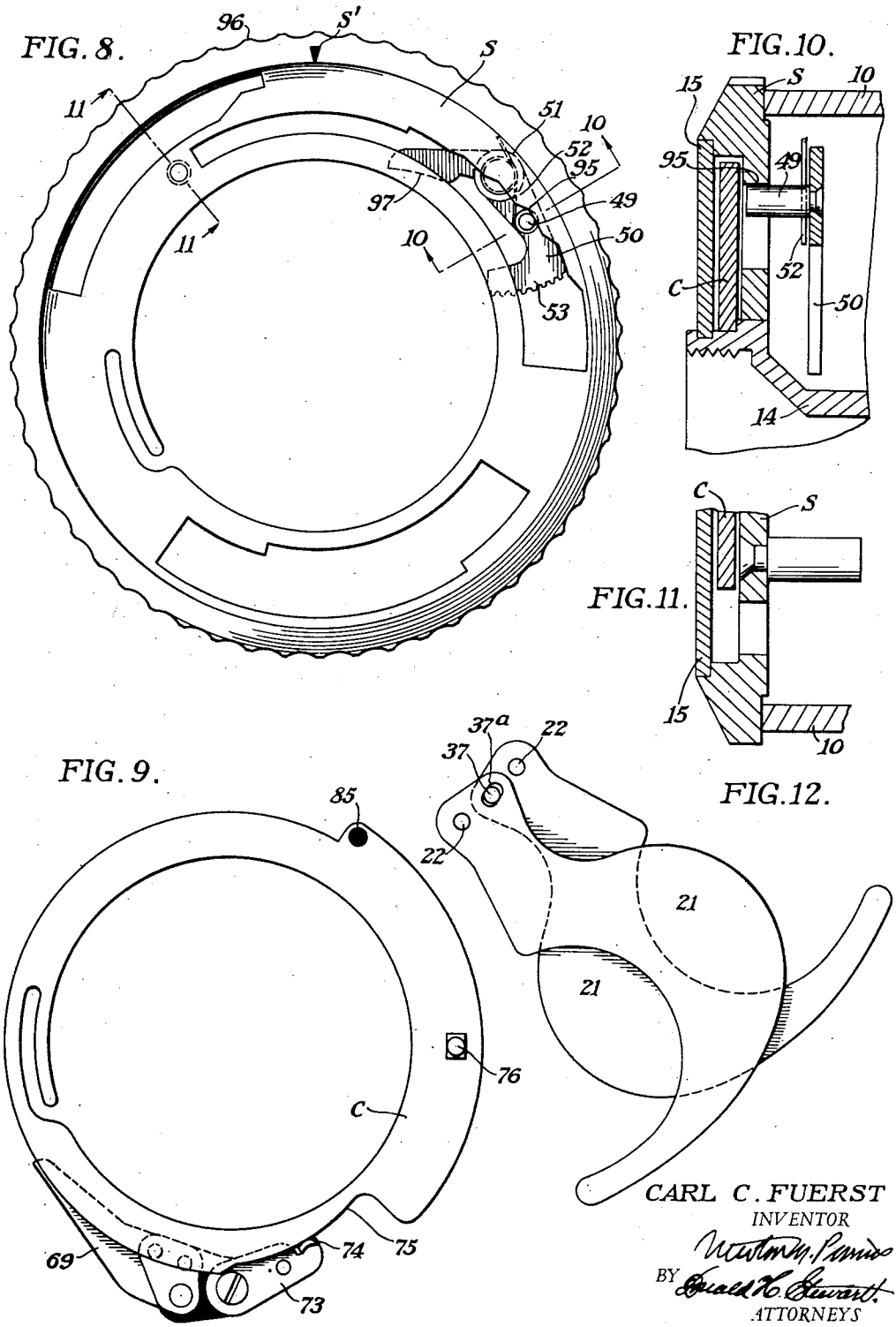

Patented June 13, 1950

2,511,201

UNITED STATES PATENT OFFICE 2,511,201

AUTOMATIC HIGH-SPEED SYMMETRICAL BLADE AND COVER BLIND SHUTTER

Carl C. Fuerst, Rochester, N. Y., assignor to Eastman Kodak Company, Rochester, N. Y., a corporation of New Jersey Application May 21, 1947, Serial No. 749,482

14 Claims. (Cl. 95—63)

This invention relates to shutters for photographic cameras and particularly to shutters of the automatic type in which the depression of a single lever, or trigger, tensions and releases the shutter mechanism. One object of my invention is to provide an automatic shutter which is capable of producing high-speed exposures without undue pressure being required on the shutter trigger. Another object of my invention is to provide a shutter of the type described in which exposures can be made with symmetrically-shaped blades moving in a single direction to open and close an exposure aperture. Still another object of my invention is to provide an automatic shutter in which cover blinds normally cover the exposure aperture and are opened only momentarily while the exposure is being made with the symmetrically-shaped shutter leaves. A still further object of my invention is to provide a shutter which can be provided with a plurality of relatively accurately-timed exposures. A still additional object of my invention is to provide a shutter with a mechanism suitable for operating a synchronizing device for flash lamps, and for vapor discharge type lamps.

It has generally been rather difficult to obtain relatively fast exposures, such as 1/200 or 1/300 of a second, for instance, with an automatic shutter, although such exposures are not particularly high speed for shutters of the setting type. In automatic shutters, the trigger must set and release the shutter mechanism and with most known constructions the degree of pressure required on the trigger is too high to satisfactorily produce exposures of say 1/200 of a second without causing the shutter to shake when the shutter trigger rides off of the mechanism which stores up power in the shutter-operating spring. It is not only the pressure required on the trigger for storing up power in the shutter spring which is difficult to overcome, and which makes an automatic shutter usually undesirable for high speeds, but it is also the fact that as the trigger has completed storing up power and as the trigger releases the shutter mechanism, it moves quite suddenly and thus is liable to shake the shutter. In my improved form of shutter, I have been able to maintain a trigger tension of approximately six ounces with a shutter mechanism which can produce an exposure of from 1/200 to 1/300 of a second in the smaller sizes, such as a shutter having an opening of .75 inch. In addition, my shutter mechanism is so constructed that at least a portion of the force applied to the trigger, as it leaves or slips off of the shutter-operating mechanism, is taken up by other mechanism which applies a load as the setting load is being released from the trigger so that there is somewhat less liability of shaking the shutter than would otherwise be the case.

Coming now to the drawings wherein like reference characters denote like parts throughout:

Fig. 1 is a front elevation of a shutter embodying a preferred form of my invention with the shutter cover plates removed exposing the shutter mechanism, the parts being shown in a normal position of rest;

Fig. 2 is a section taken on line 2—2 of Fig. 1;

Fig. 3 is a fragmentary view, like Fig. 1, with the parts in a different position. Here, the shutter trigger has been almost fully depressed and an exposure will occur when the trigger is moved slightly further through its path of movement;

Fig. 4 is a front elevation of the shutter shown in the preceding figures but with the cover plates in place;

Fig. 5 is an enlarged fragmentary section taken on line 5—5 of Fig. 3 showing a portion of the shutter trigger mechanism;

Fig. 6 is an enlarged fragmentary section through a portion of the flash lamp synchronizing mechanism and on the line 6—6 of Fig. 1;

Fig. 7 is an enlarged fragmentary detailed section, parts being shown in elevation, taken on line 7—7 of Fig. 3;

Fig. 8 is a top plan view of the speed-adjusting cam plate removed from the shutter but showing its relationship to a portion of the gear retard;

Fig. 9 is an enlarged top plan view of a synchronizer adjusting cam removed from the shutter;

Fig. 10 is an enlarged sectional detail taken on line 10—10 of Fig. 8;

Fig. 11 is a fragmentary detailed section taken on line 11—11 of Fig. 8; and

Fig. 12 is a top plan view of the cover blinds shown in their operative or closed position and removed from the shutter.

In the drawings, while the parts are very close to the actual scale, in many instances the thickness of the walls and the thickness of the metal parts has been exaggerated to better illustrate the invention.

The illustrated embodiment of my invention shows a shutter of the automatic type, that is, a shutter in which movement of the trigger in one direction both cocks and releases the shutter in moving through its path of movement from its rest position to its shutter-releasing position.

The shutter blades are of the symmetrical double-ended type. A series of these blades are swung from closed-to-open-to-closed position moving in one direction during the cocking operation, and then in a reverse direction for the exposure operation, going from closed-to-open-to-closed in the opposite direction. Because the blades go through an open position during the cocking movement, "cover-blinds" must be provided which remain closed during the cocking movement but open just before the release movement begins, and again close after the exposure is completed.

The illustrated preferred embodiment of my shutter, as shown particularly in Fig. 2, has the usual cup-like circular casing with an upstanding rim 10, a back portion 11, and a threaded collar 12, Fig. 2, adapted to receive one member of a lens and to be attached to a camera. The casing may have a mechanism plate 13, and a forward annular extension 14 of this plate constitutes another mount for a lens element and a center for the front cover 15, which latter may be provided with indicia 16, 17, 18, Fig. 4, correlated respectively with shutter speeds, diaphragm apertures, and synchroflash settings. The cover 15 is fixed in the collar 14 and serves to center a ring or collar S, which is revoluble about said cover, so that an index mark S' may be brought into register with any character on scale 16. S is therefore the speed-setting member, and is shown disassembled from the shutter in Fig. 8.

The diaphragm blades 19, Fig. 2, and the ring 20 for operating them, form no part of the present invention. However, these are indicated as lying within a recess adjacent the back 11 of the shutter casing. The cover-blinds 21, best shown in Fig. 12, are mounted on pivots 22 to be swung in opposite directions simultaneously as will be further described. In front of the cover-blinds is a fixed plate 23, Fig. 2, attached to the mechanism plate 13 and constituting a support for the symmetrical shutter blades 24, each of which is pivotally mounted in plate 23 at 25. A second fixed plate 26 overlies plate 23 and serves as a front confining member for the shutter blades.

The shutter blades 24 are moved clockwise or counterclockwise by means of an operating ring-plate 27, lying in an annular recess 28, Figs. 2 and 5, in the mechanism plate, and hereinafter referred to as the blade ring. Each shutter blade is connected with the ring 27 by a pin 29, working in a slot 30, as shown in Fig. 1.

If the ring 27 is rotated clockwise from the position of Fig. 1 the blades 24 will be turned in the same direction about their pivots 25. The first portion of this movement uncovers the exposure aperture 31 and the latter portion of the movement carries the blades to the position of Fig. 3 to again cover the exposure aperture. If the ring 27 is rotated counterclockwise from the position of Fig. 3, the blades 24 also move counterclockwise about their pivots 25 and uncover and then cover the aperture 31. If the cover-blinds 21 are closed, no exposure will result. Therefore, means are provided whereby during the clockwise or cocking movement of the shutter blades 24, the cover-blinds 21 are closed, as in Fig. 1, and during the counterclockwise or exposure movement of the shutter blades the cover-blinds are separated as in Fig. 3, leaving the aperture 31 unobstructed.

The mechanism for accomplishing the results above outlined comprises a trigger having a finger piece 32, a pin on the blade ring 42 engageable thereby, a motor-spring 45 for moving the blade ring when the latter is released, and other associated elements about to be described in detail.

The trigger is constructed of several parts, best shown in Figs. 1 and 5. The finger piece 32 is pivotally mounted on a stud 33. An extension 34 is provided for operation by a cable release, the plunger P of which may operate through a bushing 35. A second arm 36 extends toward aperture 31 when the trigger is in a rest position and is adapted to open the cover-blinds 21 when the trigger is depressed to the Fig. 3 position by contacting the pin 37 which is carried by one cover blind and which passes through an aperture 37a in the other cover-blind, as in Fig. 12. As shown in Fig. 5, a secondary lever 38 is pivoted on stud 33 and overlies the trigger 32 and is constrained to move with the latter by reason of a pin 39 which extends from the trigger through a slot 38a, the lever 38, and into a notch 39a in a flat spring 41 that tends to resiliently urge the end 40 of lever 38 toward the mechanism plate 13 so that it may engage a pin 42 projecting from the blade-operating ring 27 through a slot 43 in the mechanism plate.

When the trigger 32 is depressed, against the action of a spring 44, which holds the trigger in its rest position, Fig. 1, the end 40 of lever 32 engages pin 42 and thereby rotates blade ring 27 clockwise, which causes the shutter blades also to rotate clockwise and uncover aperture 31. Thus, the arm 38 has a cam extending away from stud 33 for moving pin 42 in a clockwise direction. As the trigger is further depressed the blades 24 close the aperture, as in Fig. 3. During this clockwise movement the master or motor spring 45, which is anchored on a fixed pin 46 and connected to a pin 47 on the blade ring 27, is fully tensioned. Fig. 3 shows the parts about to be released.

Near the last portion of the depressing movement of the trigger 32, the upper edge of the extension 36 meets pin 37 and the cover blinds 21 are opened by a very slight further movement of the trigger, against the resistance of a closing spring 48. At the beginning of this slight movement the shutter blades 24 are still fully closed, as in Fig. 3, and are held closed by the cam 40a on the extreme end of the secondary lever 38, which is curved concentrically with pivot 33. There will be no further movement of the shutter blades in either direction until the cam 40a completely passes and slips off from the pin 42.

As soon as the pin 42 is clear, spring 45 urges the blade ring 27 counterclockwise and the shutter blades begin to open. It should be noted that the portion 40 of lever 38 has an edge cam 40b so formed that it lies in a curve concentric with the blade ring and the path of pin 42 when the trigger is depressed. Therefore, levers 38 and 32 cannot be returned to their normal (Fig. 1) positions until the pin 42 has moved past the edge cam 40b, or until the shutter blades have almost completed their counterclockwise movement from the closed position of Fig. 3 through full-open, to closed position again as in Fig. 1. Because of this preventive measure, the end 36 of trigger 32 remains in contact with pin 37 and holds the cover-blinds 21 open until the shutter is almost closed after the exposure.

When the operator lifts his finger, trigger 32 and lever 38 are turned clockwise by spring 44. The outer end of pin 42 is beveled in such a manner that end 40 of lever 38 may ride up over it, because of spring 41, and move to a position below the pin as in Fig. 1, where it is ready for a succeeding operation.

A "retard" mechanism may be provided, to delay the closing of the shutter blades when they are fully open in the exposure position. This mechanism may include a bell-crank 50 pivoted at 51 and urged clockwise by a spring 52 pressing against a pin 49. This pin may be acted on by a cam 95, Fig. 8 and Fig. 10, which in a well-known manner sets the bell-crank in various positions as the ring S is turned by its roughened edge 96. It may be displaced accordingly by the pin 47 of blade ring 27 striking arm 97 during the counterclockwise movement of the blade ring. The bell crank 50 and its gear train may therefore retard ring 27 and a pallet 56 increases this retarding effect. This pallet 56 operates in conjunction with a star wheel 55, pinion 54, and gear segment 53, to create the retard or time-delay above mentioned.

A "flash synchronizing" mechanism is also provided in the shutter as herein illustrated, this mechanism being somewhat similar to that shown in my pending application Serial No. 737,351, filed March 20, 1947, but differing in operation therefrom in the specific mechanism.

A connector terminal T, Fig. 1, is provided for receiving current from a battery B which may be mounted in a suitable flashholder with a flashlamp L. The shell of the terminal is grounded on the casing rim 10 and the center post, insulated at I, is connected to an insulated metal strip 70 lying in a recess in the rim 10 and fastened to the latter by a second insulated post 71.

The mechanism for closing the circuit through lamp L at the instant the shutter is fully open is best shown in Fig. 1. A lever 57, pivoted at 58, has a gear segment 59, its lower end meshing with a pinion 60, on the shaft of which is mounted an inertia member 61. An auxiliary lever 62 is mounted on lever 57 at 57' and has a portion 63 that projects into the path of a shouldered pin 64 in blade ring 27, said pin extending forwardly through a slot 65 in the mechanism plate 13. When the blades 24 and blade ring 27 have been moved to the position of Fig. 3, that is, just prior to the disengagement of lever end 40a from pin 42, the shouldered pin 64 displaces lever 62 against the resistance of a light spring 66 and comes to rest above the upper end 63 of the lever, as in Fig. 3.

When the blade ring is free to be moved counterclockwise by spring 45 to produce an exposure, as previously described, the pin 64 drives levers 62 and 57 together against the action of a heavier spring 57a, by reason of lug 67 engaging the right side of lever 57, and, in so doing, moves segment 59 and inertia member 61. A pin 68 on lever 57 then strikes a contact lever 69 and completes the flash lamp circuit through a resilient strip 72 which is connected to strip 70 at post 71. Lever 69 is fixed to but insulated from a positioning member 73, which has an upstanding lug 74 movable by a control cam 75 indicated in broken lines in Fig. 1. The time interval between the release of pin 42 and the closing of the circuit through pin 68 and contact lever 69 is variable in accordance with the lag characteristics of different flash bulbs, by means of a finger piece 76 set in the control cam 75 carried by ring C, Fig. 9, and accessible through a slot 77 in the plate 16. This mechanism in part resembles the mechanism shown in my copending application Ser. No. 737,351, above referred to.

To enable the shutter to be used with flash apparatus of the gaseous activated type such as the well-known vapor discharge type of instantaneous flashlamp, an extension 78 of the strip 70 extends from terminal post T and its end is recurved at 79 to a hooklike shape. A lever 80, pivoted on the pin 46, is adapted to be struck and turned clockwise by the end 36 of trigger 32 each time the latter is fully depressed, the lever 80 is urged counterclockwise by a spring 80a, and a lug 82 upturned from its right end carries an insulating block 83 that normally raises the extension 78 so that the knuckle portion 79a thereof is out of the path of a pin 84 carried by blade ring 27. This pin, when it contacts the portion 79a, serves as a ground connection through the terminal T and a gaseous discharge lamp which may be substituted for the lamp I. However, the pin 84 will be contacted by the knuckle 79a only after the shutter is cocked and released, on high-speed operation, that is, while lever 80 is held by trigger end 36 in its extreme clockwise position, and while pin 68 is prevented from contacting lever 69.

The vapor discharge type of flash is usable only when the finger-piece 76 is moved to the extreme lower end of slot 77. At this time, a block of insulating material 85, which moves with the finger-piece 76 being carried by ring C (Fig. 9) and indicated in broken lines in Fig. 1, will be moved so far toward the right with reference to Fig. 3 that it will permit knuckle 79a to drop into the path of pin 84, and when the latter moves to the left the circuit will be closed.

It should be especially noted that when trigger 32 is depressed arm 38 engages and moves pin 42 and gradually tensions the spring 45 before the slip-off time arrives, Fig. 3. When surface 40a of arm 38 comes into engagement with pin 42, the pin remains substantially stationary while arm 36 engages pin 37 and opens cover-blinds 21. Thus, the force required to operate trigger 32 is not suddenly reduced to zero but is in part counteracted by the increasing tension of trigger spring 44 and cover-blind spring 48. Also, the trigger arm 36 operates lever 80 against its spring 80a. Thus, all of these springs tend to prevent a sudden shock to the shutter mechanism due to the trigger tension suddenly being released by slipping off pin 42.

In working out the flash synchronizing mechanism the travel of pin 64 is carefully correlated with the travel of the pin 42 under the setting movement of trigger arm 38 so that pin 64 may just snap behind latch 63 when the blade ring is in its maximum clockwise position and is fully set and about to be released. The movement of sector 57 through the action of latch 63 takes place before the blade ring 27 has moved far enough to open the shutter blades 24. The overlap of the blades requires considerable movement before light starts to enter and this is utilized for the synchronizer timing.

By providing symmetrical-shaped shutter blades moving in one direction for setting while the aperture is covered by cover blinds and movable in a reverse direction under the influence of the strong driving spring 45, the higher speeds are readily obtainable without undue trigger tension and a high-speed automatic shutter is possible.

I claim:

1. In a camera shutter of the type including an apertured casing, a plurality of symmetrical-shaped blades pivotally mounted in the casing and adapted to move in one direction to open and close the aperture, the combination with said shutter blades, of a blade ring operably mounted in the casing and connected to each blade, a spring connecting the blade ring and casing, a pivotally-mounted shutter trigger movable through a path of movement, cover blinds pivotally mounted in the shutter, an operating pin carried by one cover blind and engaging the other cover blind for moving both cover blinds together, said pin lying in the path of movement of the trigger near the end of said path of movement, means carried by the trigger for engaging the operating pin of the cover blinds near the end of the path of movement of the trigger for opening the blades, coating means on the trigger and blade ring for setting the blade ring, the coacting means on the blade ring including a pin on the blade ring lying in the path of the trigger and being moved thereby as the trigger moves through the major portion of its path of movement for setting the shutter, opening and closing the blades during said trigger movement before the cover blinds are opened, said coacting means on the trigger and blade ring releasing the latter at the end of the path of movement of the trigger and after the cover blinds have been opened.

2. A camera shutter, as defined in claim 1, in which the trigger carries a cam lying adjacent the path of the blade ring pin's path of movement when the trigger is depressed whereby said trigger may be held in a depressed position by said blade ring pin until said pin returns to its normal position of rest after an exposure.

3. A camera shutter, as defined in claim 1, in which the trigger carries a cam lying adjacent the path of the blade ring pin's path of movement when the trigger is depressed whereby said trigger may be held in a depressed position by said blade ring pin until said pin returns to its normal position of rest after an exposure, and means to close the cover blinds when said trigger returns to a rest position after an exposure, a bevel on the blade ring pin over which the trigger may move, and a leaf spring tending to press the trigger downwardly toward the blade ring pin.

4. A camera shutter as defined in claim 1, in which the trigger includes a finger piece, and two arms and a leaf spring thrusting downwardly upon one arm to normally hold said arm in position to engage and move the blade ring pin in one direction for setting and to snap over the blade ring pin after an exposure is made.

5. In a camera shutter of the type including an apertured casing, a plurality of symmetrical-shaped blades pivotally mounted in the casing and adapted to move in one direction to open and close the aperture, the combination with said shutter blades, of a blade ring operably mounted in the casing and connetced to each blade, a spring connecting the blade ring and casing, a pin carried by the blade ring and movable through a path, a pivotally-mounted shutter trigger movable through a path of movement different from the path of the blade ring pin and intersecting said path, cover blinds pivotally mounted in the shutter, an operating pin carried by one cover blind and engaging the other cover blind for moving both cover blinds together, said cover blind operating pin being movable through a path intersecting the end of the trigger path of movement, coacting surfaces on the trigger, blade ring operating pin and cover blind operating pin operable through moving the trigger through its path of movement for setting the blade ring spring, holding the blade ring in a set position while opening the cover blinds and releasing the blade ring pin whereby the shutter blades may be moved to open and close the shutter aperture while holding the cover blinds in an open position.

6. In a camera shutter of the type including an apertured casing, a plurality of symmetrical-shaped blades pivotally mounted in the casing and adapted to move in one direction to open and close the aperture, the combination with said shutter blades, of a blade ring operably mounted in the casing and connected to each blade, a spring connecting the blade ring and casing, a pivotally-mounted shutter trigger movable through a path of movement, cover blinds pivotally mounted in the shutter, an operating pin carried by one cover blind and engaging the other cover blind for moving both cover blinds together, said operating pin having a path of movement intersecting the path of movement of the trigger toward the end thereof, means carried by the trigger for operating the cover blinds near the end of the path of movement of the trigger, said shutter trigger being adapted to be depressed for making an exposure and including an arm having a path of movement for operating the blade ring through engagement with an operating pin carried by the blade ring, said operating pin carried by the blade ring having a different path of movement from that of the trigger and intersecting the trigger path of movement at the beginning and nearly to the end of the said path of movement of the trigger and thereby having a slip-off connection therewith, said arm including three cam surfaces, one extending away from the blade ring pivot for moving the blade ring, a second extending circumferentially of the trigger pivot for engaging and holding the blade ring in a set position and a third cam extending toward the trigger pivot for holding the trigger in a depressed position until the blade ring has moved under the impulse of its spring, said arm including three cam surfaces being movably mounted with respect to the trigger and means for turning the arm with the trigger, said blade ring pin including a beveled surface over which said resiliently-mounted arm may snap when the third cam is no longer in contact with the blade ring beveled pin.

7. In a camera shutter of the type including an apertured casing, a plurality of symmetrical-shaped blades pivotally mounted in the casing and adapted to move in one direction to open and close the aperture, the combination with said shutter blades, of a blade ring operably mounted in the casing and connected to each blade, a spring connecting the blade ring and casing, a pivotally-mounted shutter trigger movable through a path of movement, cover blinds pivotally mounted in the shutter, an operating pin carried by one cover blind and engaging the other cover blind for moving both cover blinds together, said cover blind operating pin having a path of movement coextensive with the last portion of the path of movement of the trigger, a pin carried by the blade ring having a path of movement intersecting the first part and the major portion of the path of movement of the trigger and having a slip-off connection therewith, and coacting mechanism including the trigger and engageable with the pin carried by the blade ring and the operating cover blind pin and operable by the trigger for opening and closing the shutter leaves by the blade ring pin while the cover blinds remain closed, thereby tensioning the blade ring spring, momentarily holding the blade ring in a set position while opening the cover blinds and finally slipping off and tripping the blade ring pin whereby an exposure may be made before the cover blinds close.

8. In a camera shutter of the type including an apertured casing, a plurality of symmetrically shaped blades pivotally mounted in the casing and adapted to move in one direction to open and close the aperture, the combination with said shutter blades, of a blade ring operably mounted in the casing and connected to each blade, a spring connecting the blade ring and casing, a pivotally mounted shutter trigger movable through a path of movement, cover blinds pivotally mounted in the shutter, an operating pin carried by one cover blind and engaging the other cover blind for moving both cover blinds together to an open position, said operating pin having a path of movement intersecting the last part of the path of movement of the trigger, means carried by the trigger and coacting with the operating pin for operating the cover blinds near the end of the path of movement of the trigger, means on the trigger and coacting with the blade ring for setting the blade ring during the first and major part of the trigger movement through its path, and before the trigger moves the cover blinds to an open position, the blade ring operating means including a pin on the blade ring for coacting with the trigger and lying in the path of the trigger and having a different intersecting path of movement from the path of movement of the trigger to set the shutter, said paths of movement being so arranged that the trigger may slip off the blade ring near the end of its path of movement so that the blade ring may be actuated by the spring, the trigger opening and closing the blades as the trigger moves through its path and approaches its slip-off position, and means carried by the trigger and cooperating with the blade ring pin for preventing the trigger from moving from its depressed shutter-actuating position until after the exposure has been completed.

9. In a camera shutter of the type including an apertured casing, a plurality of symmetrically shaped blades pivotally mounted in the shutter for movement in one direction to open and close the aperture, the combination with said shutter blades, of movable means operably connected to the shutter blades for moving the blades, a spring connected to the movable means for moving it in one direction, pivotally mounted cover blinds having a common blind moving member, a shutter trigger movably mounted to engage the movable means for moving the blades and having a path of movement intersecting the path of movement of the movable means to move with and slip off said means when a slip-off position is reached, the common blind operating member also having a path of movement lying in the path of movement of the trigger and being engageable by the trigger just prior to a slip-off position to open the cover blinds before the movable means connected to the blades is released by reaching said slip-off position, a stud carrying the trigger, the trigger comprising a first pivoted member mounted to turn about the stud and positioned to coact with the common blind moving member, a second pivoted arm coacting with the movable means operably connected to the shutter blades, the second arm being mounted to turn about the stud and being movable in an axial direction relative thereto, and a spring for pressing the second arm toward the movable means operably connected to the shutter blades.

10. In a camera shutter of the type including an apertured casing, a plurality of symmetrically shaped blades pivotally mounted in the shutter for movement in one direction to open and close the aperture, the combination with said shutter blades, of movable means operably connected to the shutter blades for moving the blades, a spring connected to the movable means for moving it in one direction, pivotally mounted cover blinds having a common blind moving member, a shutter trigger movably mounted to engage the movable means for moving the blades and having a path of movement intersecting the path of movement of the movable means to move with and slip off said means when a slip-off position is reached, the common blind operating member also having a path of movement lying in the path of movement of the trigger and being engageable by the trigger just prior to a slip-off position to open the cover blinds before the movable means connected to the blades is released by reaching said slip-off position, a stud carrying the trigger, the trigger comprising a first pivoted member mounted to turn about the stud and positioned to coact with the common blind moving member, a second pivoted arm coacting with the movable means operably connected to the shutter blades, the second arm being mounted to turn about the stud and being movable in an axial direction relative thereto, and a flat spring carried by the trigger and pressing the second arm in an axial direction relative to the stud and toward the movable means operably connected to the shutter blades.

11. In a camera shutter of the type including an apertured casing, a plurality of symmetrical-shaped blades pivotally mounted in the shutter for movement in one direction to open and close the aperture, the combination with said shutter blades, of movable means operably connected to the blades for moving the blades, a spring connected to the movable means for moving it in one direction, pivotally mounted cover blinds having a common blind moving member, an operating pin on the movable means for the blades, and a shutter trigger comprising three parts mounted to turn on a stud, a first part including one arm positioned to coact with the common blind moving member and a finger release and including an upstanding pin, a second part including a second arm positioned to coact with and release the operating pin on the movable means for the blades and means for engaging and being guided by the upstanding pin, and a third part of spring material also having means for engaging and being guided by said upstanding pin, said third part pressing the second part towards the first part and permitting the second part to move in a generally axial direction with respect to the first part to snap over the pin carried by the means for moving the blades, movement of the trigger through a path first moving the second part arm and with it the pin carried by the means for moving the blades over which the arm has previously snapped, thereby moving the blades to open and close the aperture in the shutter casing and to set the spring, and after the blades are closed engaging the first part arm with the common cover blind operating member to open the cover blinds, still further movement of the trigger causing the second part member to slip off the pin carrying the means for moving the blades to permit the spring to move the blades to make an exposure.

12. In a camera shutter of the type including an apertured casing, a plurality of symmetrical-shaped blades pivotally mounted in the shutter for movement in one direction to open and close the aperture, the combination with said shutter blades, of movable means operably connected to the blades for moving the blades, a spring connected to the movable means for moving it in one direction, pivotally mounted cover blinds having a common blind moving member, an operating pin on the movable means for the blades, and a shutter trigger comprising three parts mounted to turn on a stud, a first part including one arm positioned to coact with the common blind moving member and a finger release and including an upstanding pin, a second part including a second arm positioned to coact with and release the operating pin on the movable means for the blades and means for engaging and being guided by the upstanding pin, and a third part of spring material also having means for engaging and being guided by said upstanding pin, said third part pressing the second part towards the first part and permitting the second part to move in a generally axial direction with respect to the first part to snap over the pin carried by the means for moving the blades, movement of the trigger through a path first moving the second part arm and with it the pin carried by the means for moving the blades over which the arm has previously snapped, thereby moving the blades to open and close the aperture in the shutter casing and to set the spring, and after the blades are closed engaging the first part arm with the common cover blind operating member to open the cover blinds, still further movement of the trigger causing the second part member to slip off the pin carrying the means for moving the blades to permit the spring to move the blades to make an exposure, the second arm member spring-pressed against the pin carried by the means for moving the blades including a cam end shaped to ride along said pin after the shutter blades are opened and closed without further moving the blades and before releasing the blades, causing a dwell in the movement of the blades, during which time said first arm member may engage and move the cover blinds to an open position.

13. In a camera shutter of the type including an apertured casing, a plurality of symmetrically shaped blades pivotally mounted in the shutter for movement in one direction to open and close the aperture, the combination with said shutter blades, of movable means operably connected to the blades for moving the blades, a spring connected to the movable means for moving it in one direction to make an exposure, pivotally mounted cover blinds having a common blind moving member, an operating pin on the movable means for the blades, a shutter trigger, arms on the shutter trigger for first engaging and moving the means operably connected to the shutter blades to open and close the blades and to set the spring, and second, for engaging and moving the common blind moving member after the shutter blades are set, said trigger including a finger piece and spaced arms carried on a stud support, one of said arms being resilient and engaging the moving pin on the means for moving the blades to set the blade operating spring, the other of said arms engaging the common cover blind moving member after the blade operating spring is set, said resilient arm and pin moving through different intersecting paths until one slips off the other to release the spring, and a cam on the arm for moving the pin on the means for moving the shutter blades to be engaged by said pin after the trigger has set and released the pin whereby the trigger may be held against movement in an opposite direction until the spring on the blade-moving means has moved the blades to open and close the shutter aperture.

14. In a camera shutter of the type including an apertured casing, a plurality of symmetrically shaped blades pivotally mounted in the casing and adapted to move in one direction to open and close the aperture, the combination with said shutter blades, of a blade ring operably mounted in the casing and connected to each blade, a spring connecting the blade ring and casing, a pivotally mounted shutter trigger movable through a path of movement, cover blinds mounted in a shutter, an operating pin carried by one cover blind having a path of movement intersecting the path of movement of the trigger and engaging the other cover blind for moving both cover blinds together, the shutter trigger being movable for making an exposure and including an arm movable through a path for moving the blade ring through engagement with the operating pin carried by the blade ring to a position in which the spring is set, means carried by the trigger and coacting with the operating pin carried by one cover blind for operating the cover blinds near the end of the path of movement and after the shutter is set, the arm on the trigger for moving the blade ring including three cam surfaces, one extending away from the trigger pivot for moving the blade ring, a second extending circumferentially of the trigger pivot for holding the blade ring in a set position, and a third extending toward the trigger pivot for holding the trigger in a depressed position until the blade ring has moved under the impulse of its spring.

CARL C. FUERST.

REFERENCES CITED

The following references are of record in the file of this patent:

UNITED STATES PATENTS

| Number | Name | Date |
|---|---|---|
| 2,382,623 | Fuerst | Aug. 14, 1945 |
| 2,384,615 | Fuerst | Sept. 11, 1945 |

Certificate of Correction

Patent No. 2,511,201 June 13, 1950

CARL C. FUERST

It is hereby certified that errors appear in the printed specification of the above numbered patent requiring correction as follows:

Column 7, line 15, for the word "coating" read *coacting*; line 59, for "connetced" read *connected*; column 8, line 37, after "for" strike out "engaging and" and insert the same before "moving" in line 35, same column;

and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*